UNITED STATES PATENT OFFICE.

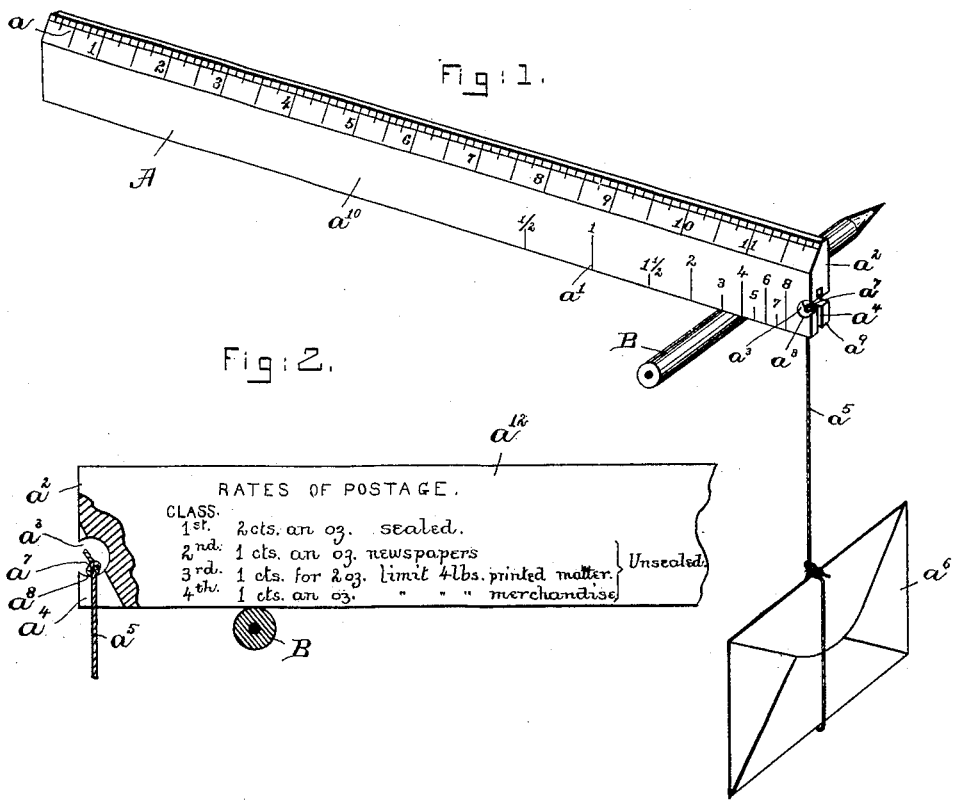

HOWARD F. EATON, OF QUINCY, MASSACHUSETTS.

COMBINED WEIGHING AND MEASURING APPARATUS.

SPECIFICATION forming part of Letters Patent No. 601,224, dated March 22, 1898.

Application filed January 23, 1897. Serial No. 620,479. (No model.)

*To all whom it may concern:*

Be it known that I, HOWARD F. EATON, a citizen of the United States, residing at Quincy, in the county of Norfolk, State of Massachusetts, have invented a new, useful, and simple Improvement in a Combined Apparatus for Weighing and Measuring; and I hereby declare the following to be a full, clear, and exact description of this invention, such as will enable others skilled in the art to which it pertains to make and use the same.

My invention relates to an improvement in a combined apparatus for weighing and measuring, the object of the same being to provide a simple and efficient method of ascertaining the correct weight of mailable articles, also in connection therewith a scale for measuring purposes; and with this object in view my invention consists in certain details of construction, which will be hereinafter described, and pointed out in the claim.

In the accompanying drawings, Figure 1 shows in perspective the invention as arranged to weigh a letter. Fig. 2 is the opposite side view of the weighing and measuring device.

The invention is shown as a foot-rule A, and on the side $a^{10}$ is an index for measuring on one edge, as at $a$, and upon its opposite edge an index, as at $a'$, to indicate the weight. At the end $a^2$ is a hole $a^3$, bored in the weighing and measuring device in such a manner that one side is open, and through the end a slot $a^4$ is cut. The object of this hole $a^3$ and slot $a^4$ is to provide a quick and simple way of attaching a string $a^5$ to the end $a^2$ for holding any article to be weighed, which is shown in the accompanying drawings as a letter $a^6$. It will be seen that the string $a^5$ has a knot $a^7$, which centralizes itself at the lowest point $a^8$ in the hole $a^3$, which secures a correct ratio between the balancing and suspending pivots. The slot $a^4$ allows the string $a^5$ to hang central that the weighing device A may balance evenly on the flat surface $a^9$. This flat surface $a^9$ allows the weighing device A to balance on the pencil B.

In order to use the device for weighing, a person will suspend from the end $a^2$ the article to be weighed, and, holding in his hand the pencil B, he will move the ruler or measuring device A along the surface $a^9$. He will hold the weighing and measuring device A and move the pencil B until an even balance is obtained, when by looking at the index $a'$ the correct weight will be shown, and by comparison with the table on the side $a^{12}$ the correct amount required for postage may be ascertained. It will be seen that the balance of articles of various weights is accomplished by the increase and decrease of leverage.

In describing my invention I want it understood that no counterweight is necessary or used.

As there is nothing novel in the part for measuring, I do not desire to claim the same specifically, but do desire to in combination with my construction of weighing apparatus as shown and described.

I claim—

As an article of manufacture, a weighing and measuring strip having one of its faces provided with two sets of graduations, one set located near the edge of the face and indicating units of length, and the other set at the opposite edge of the same face, indicating units of weight; said strip being also provided at one end with a lateral slot extending through from face to face, and with a second slot at right angles to the first and extending from the outer edge of said strip to and through said first-named slot, the relative positions of said slots being such as to hold suspended a cord knotted at its end, the knot resting in the first or transverse slot while the cord lies in the second or vertical slot, supporting at its other end the article to be weighed, substantially in the manner as illustrated and described.

HOWARD F. EATON.

Witnesses:
 ARTHUR H. RUSSELL,
 RALPH S. BARTLETT.